United States Patent
Bath et al.

(10) Patent No.: US 6,350,085 B1
(45) Date of Patent: Feb. 26, 2002

(54) CABLE DEPLOYMENT SYSTEM AND METHOD OF USING SAME

(75) Inventors: William R. Bath, Cypress; Gary L. Holtz, Houston, both of TX (US); Frank Sayle, Morgan City, LA (US); Charles R. Yemington, Houston, TX (US)

(73) Assignee: Sonsub International, Inc., Houston, TX (US)

( * ) Notice: Subject to any disclaimer, the term of this patent is extended or adjusted under 35 U.S.C. 154(b) by 0 days.

(21) Appl. No.: 09/366,106

(22) Filed: Aug. 2, 1999

(Under 37 CFR 1.47)

Related U.S. Application Data

(60) Provisional application No. 60/095,309, filed on Aug. 4, 1998.

(51) Int. Cl.$^7$ ............................................... B63B 35/03
(52) U.S. Cl. .................... 405/154.1; 405/165; 405/166; 405/172
(58) Field of Search .................... 405/154.1, 155, 405/158, 164, 165, 166, 168.1, 168.2, 168.3, 168.4, 172, 177

(56) References Cited

U.S. PATENT DOCUMENTS

| | | | | |
|---|---|---|---|---|
| 3,331,212 A | * | 7/1967 | Cox et al. ................. | 405/168.1 |
| 3,512,367 A | * | 5/1970 | McLallen, Jr. ....... | 405/168.3 X |
| 3,687,418 A | * | 8/1972 | Halvorsen ................... | 254/279 |
| 3,712,100 A | * | 1/1973 | Key et al. ............ | 405/168.3 X |
| 4,260,288 A | * | 4/1981 | Ellers et al. ................ | 405/168 |
| 4,436,449 A | * | 3/1984 | Smoot et al. ........... | 405/158 X |
| 4,624,645 A | * | 11/1986 | Kiely et al. ............. | 405/207 X |
| 4,714,830 A | * | 12/1987 | Coutrel ........................ | 405/168 |
| 4,765,711 A | * | 8/1988 | Obst ....................... | 405/154 X |
| 5,069,580 A | * | 12/1991 | Herwig et al. .............. | 405/191 |
| 5,197,716 A | * | 3/1993 | Zibilich, Jr. et al. .. | 405/168.4 X |
| 5,362,921 A | * | 11/1994 | Birkelund et al. ...... | 405/158 X |
| 5,421,674 A | * | 6/1995 | Maloberti et al. .......... | 405/166 |
| 5,707,174 A | * | 1/1998 | Garren ................... | 405/158 X |
| 5,722,793 A | * | 3/1998 | Peterson ..................... | 405/164 |
| 5,979,838 A | * | 11/1999 | Romagnoli, Jr. ........ | 405/158 X |
| 6,012,495 A | * | 1/2000 | Antonsen ................ | 405/158 X |
| 6,044,786 A | * | 4/2000 | Dudley et al. .............. | 114/242 |
| 6,113,312 A | * | 9/2000 | Norholmen .................. | 405/157 |

FOREIGN PATENT DOCUMENTS

GB 2070724 * 9/1981 ................. 405/166

* cited by examiner

Primary Examiner—David Bagnell
Assistant Examiner—Jong-Suk Lee
(74) Attorney, Agent, or Firm—Akin, Gump, Strauss, Hauer & Feld, LLP

(57) ABSTRACT

A cable deployment system and method for laying a cable on the sea floor. The cable deployment system includes a cable having a first cable section connected to a riser cable section. The riser cable section includes an armor that is connected to a drum capable of containing a required length of the first cable section. A stinger is attached to the drum and shaped to allow the first cable section to exit the drum. The cable deployment system also includes a tensioning device attached to the drum. The tensioning device is capable of maintaining a tension in the first cable section during deployment of the first cable section from the drum. The method of deploying the cable in deep water from a surface vessel includes the steps of containing the first cable section within the drum and lowering the drum from the surface vessel. An end of the first cable section is secured to the sea floor and the first cable section is deployed from the drum onto the sea floor.

27 Claims, 5 Drawing Sheets

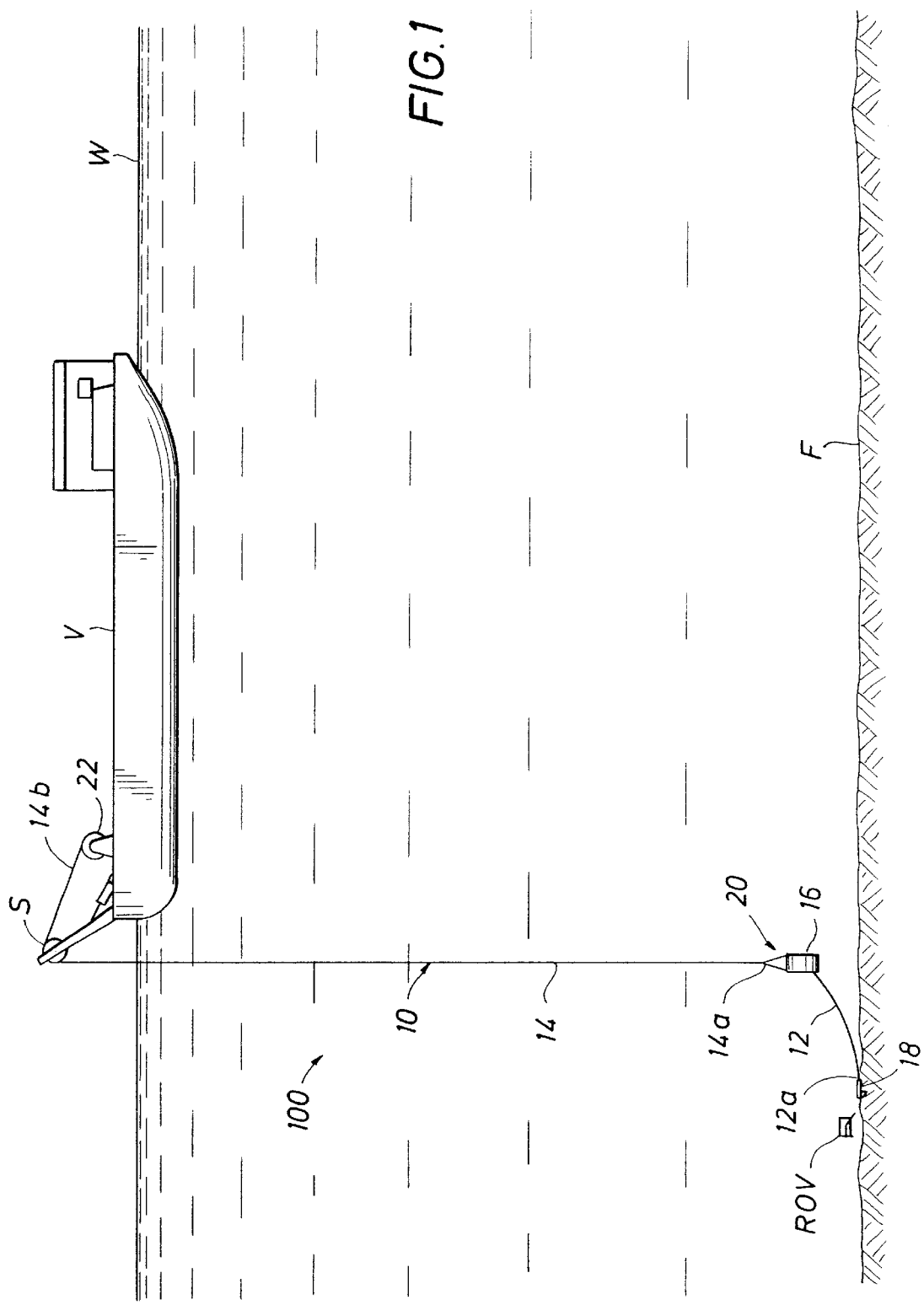

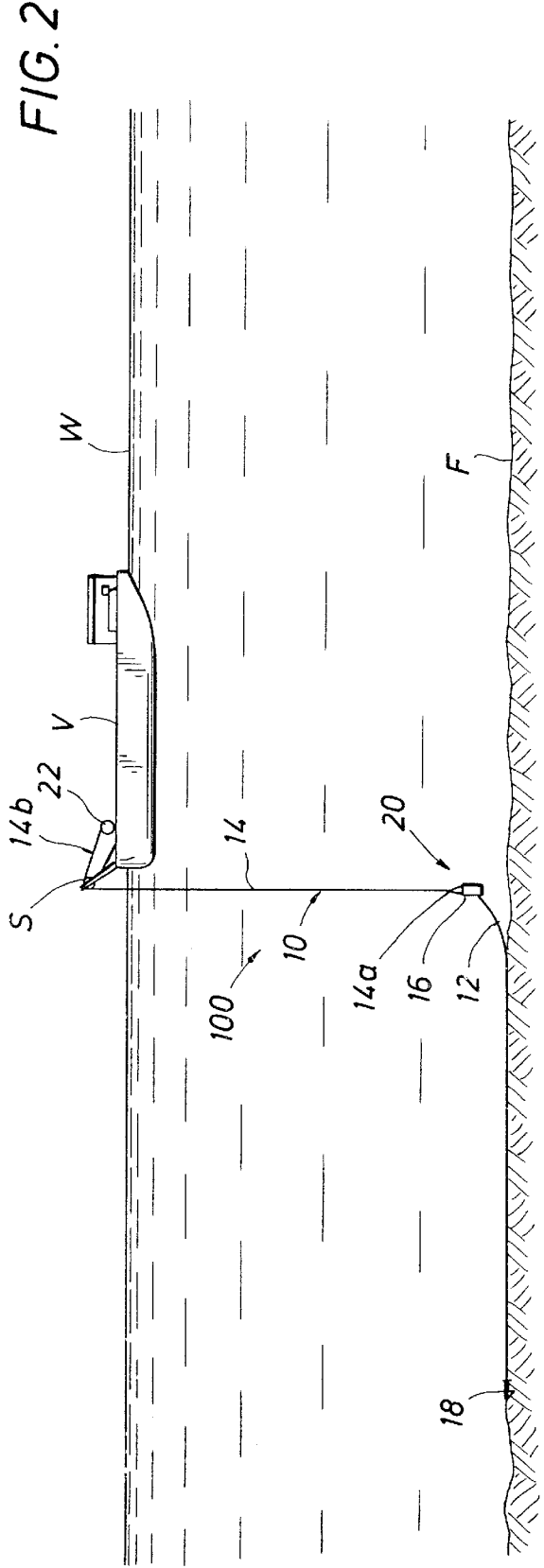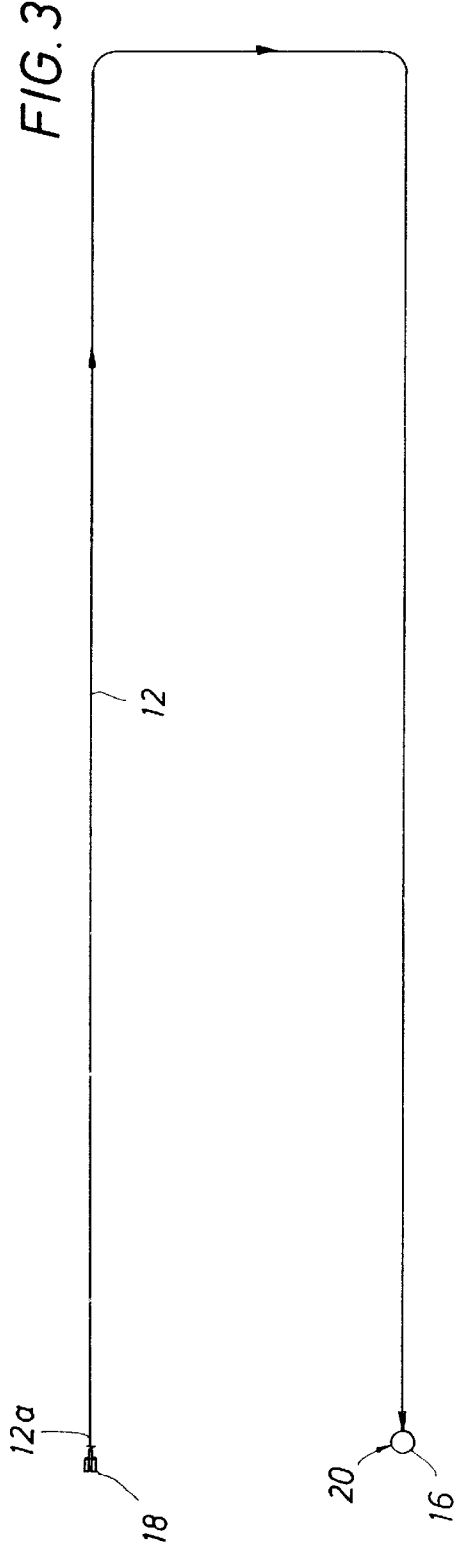

CABLE DEPLOYMENT SYSTEM AND METHOD OF USING SAME

CROSS-REFERENCE TO RELATED APPLICATIONS

This application claims priority from provisional patent application Ser. No. 60/095,309, filed Aug. 4, 1998.

BACKGROUND OF THE INVENTION

1. Field of the Invention

The present invention relates generally to cable deployment systems for laying cables on the sea floor in deep water and a method of using the cable deployment system for laying cables on the sea floor.

2. Description of the Related Art

Offshore oil production has only moved into the very deep waters in recent years, and all known seismic surveys to date in deep water have been done with seismic cables towed behind a vessel of opportunity. New seismic techniques are presenting the need to lay relatively short cables having a total length of only 3 to 5 times the water depth. These new seismic techniques require permanently installing seismic arrays on the sea floor to monitor the depletion of deep water hydrocarbon reservoirs.

The prior art of laying cables on the sea floor in deep water has concentrated primarily on long lines such as intercontinental telecommunications lines. All cables known to have been laid on the sea floor in deep water are long lines and/or are suitable for fabrication with a strength member, or have in some way compromised the need for cost effective, highly reliable installation.

Conventional cable laying vessels are not well suited for handling short cable lengths. Furthermore, since laying short cables does not economically justify employment of a purpose built cable lay vessel, there is a need for a cable laying technique that is compatible with vessels of opportunity.

The method by which short cables in deep water are connected to a surface facility also differs significantly from prior art in that a vertical "riser" section must be installed from the sea floor to the surface. Seismic cables are highly sensitive cables comprising jacketed electrical conductors and hydrophones or geophones. The requirements of seismic cables are such that the design of the riser section of the cable must be significantly different from the part that lays on the sea floor, although it is necessary to maintain electrical continuity of multiple internal conductors. It is also desirable to minimize the number of electrical connections.

Seismic cable cannot be subjected to tensile forces or compressive loads, which would damages the geophones or break the fine electrical conductors in the cable. Laying seismic cable by hanging it from the deck of a vessel to the sea floor would result in high load forces in the cable due to the weight of suspended cable, vessel heave, water currents, and other perturbations. Lashing the cable to a strength member, such as a wire rope, is a hazardous activity for deck crews, and it extends the vessel time required to lay the cable. Such a requirement also adds expense for the strength member, hold back equipment and lashings. Long lengths of suspended electrical cable are prone to conductor damage due to tension in the cable. Relatively high tensile loads are encountered when cables are deployed to the seafloor from surface vessels in deep water. Strength members are commonly used to take the tension and thereby protect the wires. Strength members must be either inside or outside of the cable. An external strength member is not suitable for use on a seismic cable because it would isolate the geophones and hydrophones from the vibrations they are meant to detect. An internal strength member is not suitable because the device which supports the weight of the suspended cable, be it a winch drum or a tensioning device would impart high compression loads to the geophones and hydrophones. It is desirable to have a means to deploy such cables in deep water in a cost efficient manner without imparting high loads to the electrical conductors or sensors.

A permanently installed riser requires armor to protect it from abrasion, marine life, and other hazards common to the marine environment. It is desirable to make additional use of the armor to provide support for the weight of the cable as it is deployed, as well as the deployment system.

The strength of an electrical signal from a geophone or hydrophone, which is required to drive several kilometers of small gauge wire, is very low. When a long length of this wire is moved through the earth's magnetic field, as the riser is moved by wave action, the induced electrical noise can result in an undesirable signal-to-noise ratio. It is desirable to provide electromagnetic shielding for the riser section without interfering with the functions of the geophones and hydrophones in the sea floor segment of the cable.

The reliability of electrical connectors is low in comparison to continuous wires. It is desirable to provide a system whereby electrical continuity can be maintained in a combined seismic cable and riser assembly without using connectors.

Ocean currents, which may flow in different directions at various depths in a single water column, make it difficult to control precise cable positioning. Prior art methods for laying subsea cables rely solely on positioning of the surface vessel to determine the position in which the cable lays on the seafloor. It is desirable to have the ability to accurately lay the cable in a predetermined pattern on the seafloor.

SUMMARY OF THE INVENTION

The present invention is suitable for laying cable segments on the sea floor in deep water for various purposes, and in particular offers advantages for laying seismic cable comprised of jacketed electrical conductors and hydrophones or geophones.

The cable deployment system of the present invention provides for controlling the attitude of the submersible cable-laying device as the cable is deployed, and for maintaining adequate tension in the cable to deploy it in an orderly manner without inducing excessive forces in the cable. It also includes provisions for determining and controlling the final cable position with greater accuracy than could be achieved if the cable were deployed from the surface.

The cable deployment system provides for a riser to be an integral section of the cable and for all electrical connections in the cable to be factory-made without field splices or connectors.

Conductors in the riser section are isolated from electrical noise, which could be induced as waves and water currents move the riser through the earth's magnetic field. The present invention also provides for supporting the weight of the riser and for protecting the riser cable against abrasion, shark bites, and other marine hazards.

The present invention also includes provisions for laying cable in specific patterns on the sea floor with high accuracy, including 90-degree turns, regardless of current conditions in the water above the deployment location.

The method of using the cable deployment system comprises lowering the drum of cable to a location just above the sea floor. The drum of cable is deployed by a submersible cable laying system. The riser section of the cable is used as the lowering line, and the drum can be secured to the sea floor to serve as an anchor base for the riser section.

BRIEF DESCRIPTION OF THE DRAWINGS

In order to more fully understand the drawing referred to in the detailed description of the present invention, a brief description of each drawing is presented, in which:

FIG. 1 is vertical elevational view of the cable deployment system of the present invention, showing the submersible deployment system deployed from the riser cable and lowered to a location just above the sea floor by the riser cable drum;

FIG. 2 is a vertical elevational view of the cable deployment system showing the cable being laid on the sea floor;

FIG. 3 is a top plan view of the sea floor showing the layout of the cable on the sea floor with the arrows indicating the direction of the cable laying process;

DETAILED DESCRIPTION OF INVENTION

Figure 5:
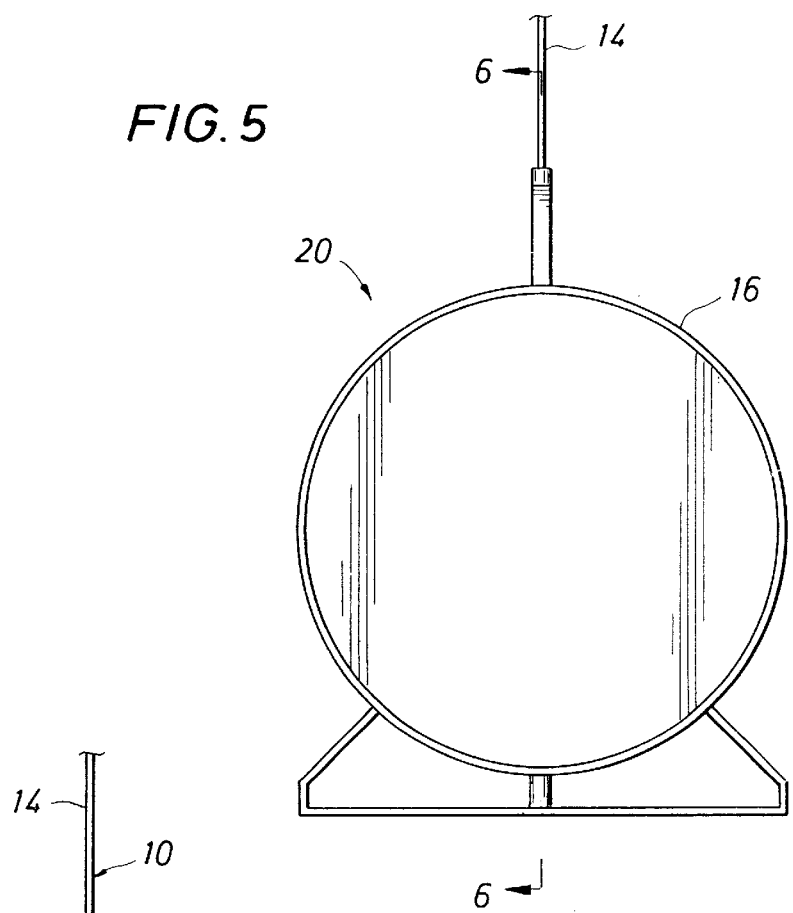
FIG. 5 is an elevational view of the submersible cable deployment system of the present invention.
Figure 6:
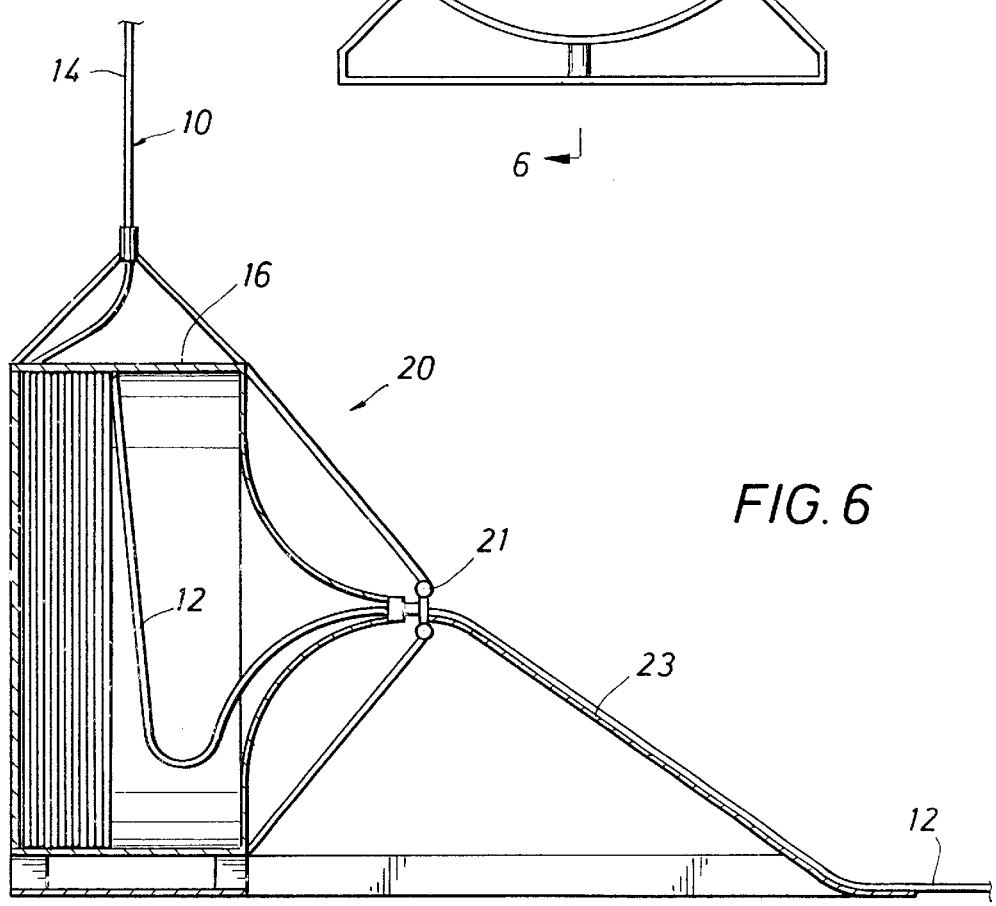
FIG. 6 is a sectional view taken along lines 6—6 of FIG. 5.
Figure 9:
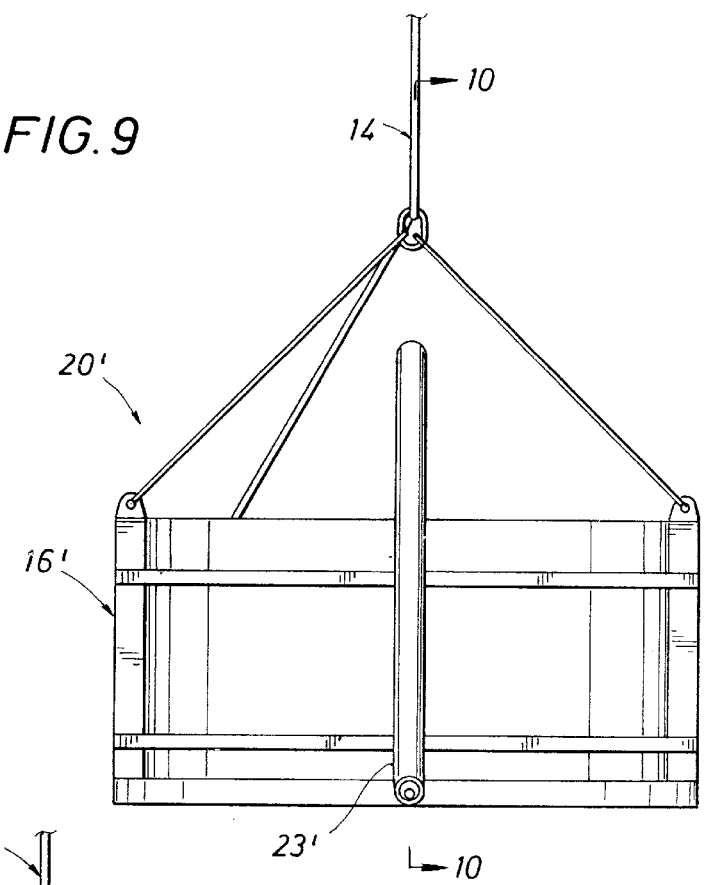
FIG. 9 is an elevational view of another embodiment of the submersible cable deployment system.
Figure 10:
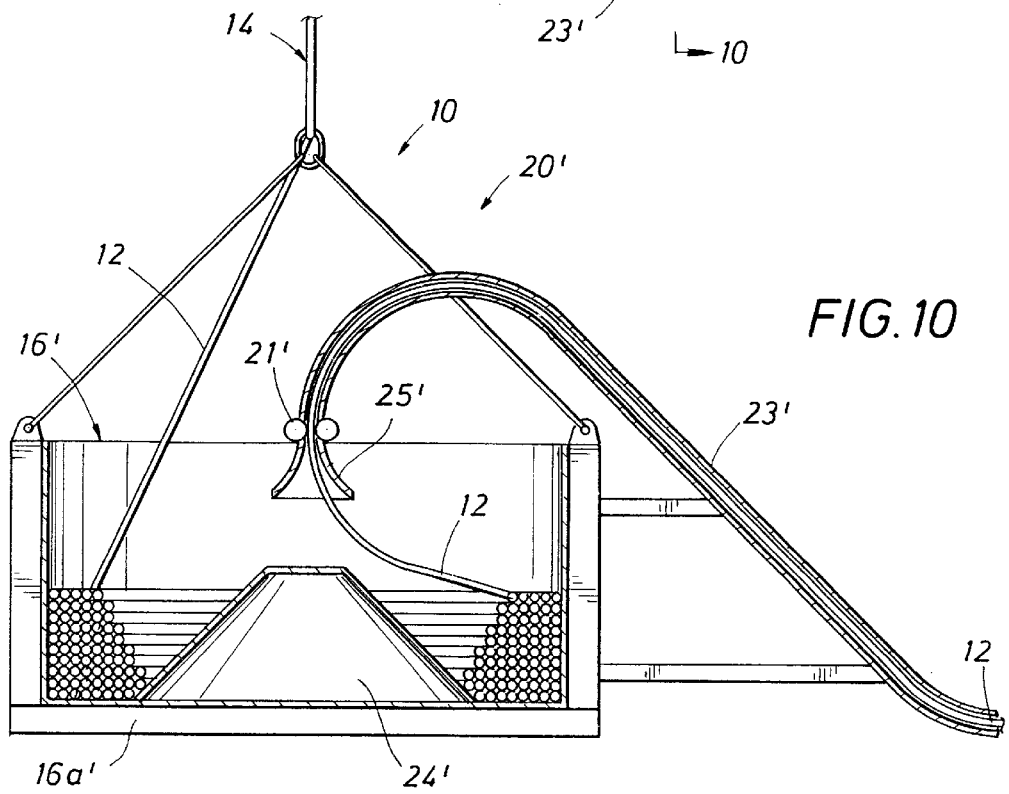
FIG. 10 is a sectional view taken along lines 10—10 of FIG. 9.

The cable deployment system 100 of the present invention will now be described in detail with reference to the drawings. Referring to FIG. 1, a cable, generally referred to as 10, includes a first cable section 12 and a riser cable section 14. Referring to FIGS. 1, 5, 6, 9 and 10, the first cable section 12 is coiled inside a drum 16, preferably cylindrical, of sufficient size to accommodate the allowable bend radius of the first cable section 12 and to hold the required length of the first cable section 12. As will be described below, the first cable section 12 has a length sufficient to form the desired cable layout on the sea floor F. The cylindrical drum 16, when fitted with the described equipment and instrumentation constitutes the submersible cable deployment system 20. The submersible cable deployment system 20 provides an integrated transportation and deployment system as will be explained below. It is to be understood that one embodiment of the submersible cable deployment system 20 is shown in FIGS. 5 and 6 and another embodiment 20' is shown in FIGS. 9 and 10.

The first cable section 12 includes a tail end 12a (FIG. 1) which is terminated to an anchor device 18 (FIGS. 1, 7 and 8), which serves as a holdback on the sea floor F during deployment of the first cable section 12. The first cable section 12, which includes the geophones (not shown), is coiled inside the drum 16 (FIG. 6) or 16' (FIG. 10) in such a manner that it can be pulled from the drum 16 without entanglement as shown in FIGS. 6 and 10.

Preferably, the riser cable section 14 includes a first end 14a extending from the first cable section 12 at the drum 16, 16' and a second end 14b that is spooled onto a second drum 22, preferably a winch drum, which remains on the deck of a surface vessel V as shown in FIG. 1. The riser cable section 14 will serve as the riser and is armored accordingly. Initially, the armored riser cable section 14 is substantially entirely spooled onto the winch drum 22. As will be explained below, the winch drum 22 is used to lower the submersible cable deployment system 20, 20' to the sea floor F.

Figure 4:
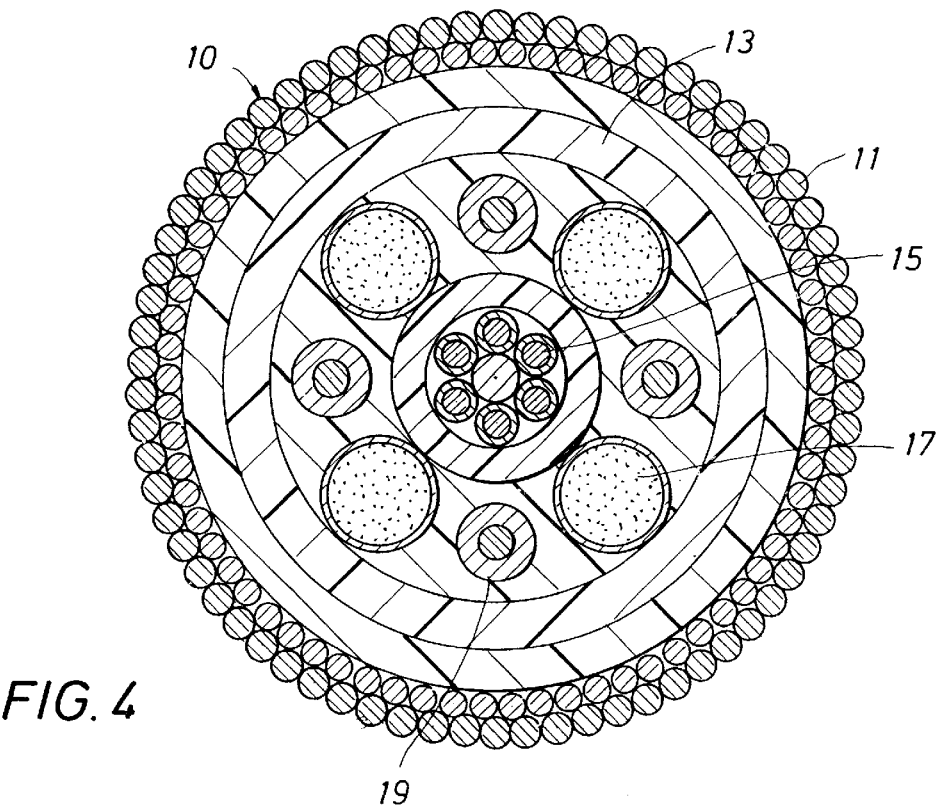
FIG. 4 is a sectional view of the armored riser cable of the present invention.

Preferably, as shown in FIG. 4, the armor comprises external steel wires 11 that protect the cable 10 and have sufficient load rating to serve as the lowering line for the submersible cable deployment system 20, 20'. The steel wires 11 encapsulate a protective jacket 13. Within the protective jacket 13 are wire or fiber conductors 15, electrical conductors 17, and fiber optic conductors 19. Both fiber and wire can be used to connect the geophones. The fiber is connected from each geophone and runs through the armored cable to the surface.

Referring to FIGS. 5, 6, 9 and 10, the lower end of the armor 11 is secured and terminated to the drum 16, 16' to provide a load path from the surface winch 22 to the submersible cable deployment system 20, 20' and its contents and appurtenances. Preferably, the armor 11 is made from ferromagnetic material to provide electromagnetic isolation for the riser cable section 14.

As shown in FIGS. 6 and 10, the submersible cable deployment system 20, 20' preferably includes a tensioning device 21, 21' for maintaining a tension in the first cable section 12 as the cable 12 is deployed as explained below. The tension is automatically maintained at a level high enough to ensure orderly lay of the first cable section 12 on the sea floor F but low enough to be within the rated working load of the cable 12. Preferably, a stinger 23, 23' is mounted to the drum 16, 16'. The stinger 23, 23' is a contoured frame that conducts the first cable section 12 out of the drum 16, 16' and down onto the sea floor F as will be explained below. Preferably, the stinger 23, 23' is generally "S" shaped to allow the cable 12 to exit the drum 16 horizontally and then lay horizontally on the sea floor F or to allow the cable 12 to exit the drum 16' vertically and then lay horizontally on the sea floor F.

The submersible cable deployment system 20' of FIGS. 9 and 10 shows the stinger 23' as being a curved tubular member through which the first cable section 12 passes as it is deployed from the drum 16'. Additionally or optionally, the submersible cable deployment system 20' includes a truncated conical section 24' mounted to a base 16a' of the drum 16' and positioned above the truncated conical section 24' is a funnel member 25' through which the first cable section 12 passes. The truncated conical section 24' prevents the first cable section 12 from becoming entangled in the drum 16' or as it is being deployed.

The submersible cable deployment system 20, 20' can be fitted with a docking fixture (not shown) for a remotely operated submersible vehicle ROV, which can be used to control the attitude and position as the cable 10 is deployed. Alternatively, the submersible cable deployment system 20, 20' can be fitted with thrusters and heading sensors (not shown) and extra conductors in the riser cable section 14 to provide power and control signals so that the position and attitude of the submersible cable deployment system 20, 20' can be controlled without docking with a remotely operated vehicle ROV. The submersible cable deployment system 20, 20' can also be fitted with an acoustic beacon or transponder (not shown) to facilitate tracking by an acoustic system (not shown) to determine and control its position with respect to sea floor coordinates or to the vessel V.

The method of using the system 100 will now be described in detail. The submersible cable deployment system 20, 20' is hoisted over the side of the surface vessel V and lowered until the load is transferred to a riser overboarding sheave cap S. Referring to FIG. 1, the riser cable section 14 is then unspooled from its winch drum 22 at a controlled rate to lower the submersible cable deployment system 20, 20' to within a few feet of the sea floor F.

Figure 7:
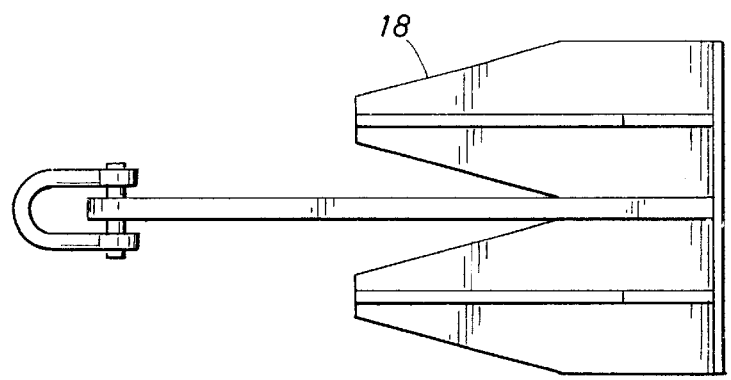
FIG. 7 is a top plan view of the anchor of the present invention.
Figure 8:
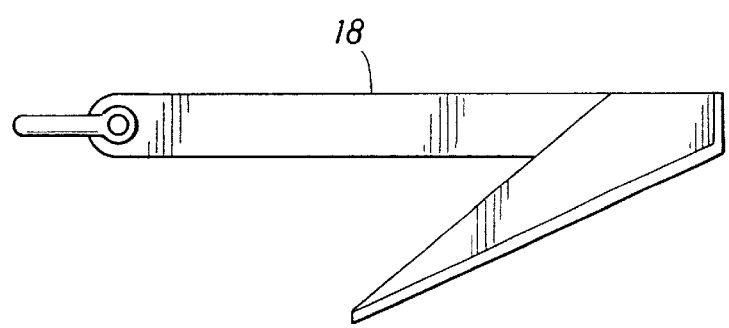
FIG. 8 is a side view of the anchor of the present invention.

As shown in FIGS. 6 and 10, a tensioning device 21, 21' on the submersible cable deployment system 20, 20' maintains a tension in the first cable section 12 between the submersible cable deployment system 20, 20' and the sea floor anchor 18. The tension is automatically maintained at a level high enough to ensure orderly lay of the first cable section 12 on the sea floor F but low enough to be within the rated working load of the cable 12. A remotely operated submersible vehicle ROV is then used to begin pulling the tail end 12a of the first cable section 12 from the submersible cable deployment system 20, 20' and to secure the tail end 12a to an anchor 18 on the sea floor F. A typical anchor 18 used with the present invention is shown in FIGS. 7 and 8.

Passing the tensioned first cable section 12 through a "stinger" or tail section 23, 23' can generate torque to prevent the submersible cable deployment system 20 from rotating about the axis of the riser cable section 14. Referring to FIGS. 6 and 10, the stinger 23, 23' is a contoured frame that conducts the first cable section 12 out of the drum 16, 16' and down onto the sea floor F. Preferably, the stinger 23, 23' is generally "S" shaped to allow the cable 12 to exit the drum 16 horizontally and then lay horizontally on the sea floor F or to allow the cable 12 to exit the drum 16' vertically and then lay horizontally on the sea floor F. The stinger 23, 23' can be used as a lever arm to maintain the horizontal orientation of the drum 16, 16' as the cable 12 is laid. Alternatively, a remotely operated submersible vehicle ROV can be docked to the submersible cable deployment system 20, 20' or thrusters on the submersible deployment system 20, 20' can be used to prevent rotation around the axis of the riser cable section 14 or to guide the submersible deployment system 20, 20' around turns as the cable 12 is deployed.

Payout of the cable 12 is achieved by motoring the surface vessel V which supports the riser 14 along the desired route of the cable 12. The vessel's acoustic tracking system provides the position data needed to guide the vessel V. The rate at which cable 12 can be discharged from the inside of the drum 16, 16' and passed through the tensioning device 21, 21' is the only deployment system characteristic which limits the steady state forward speed of the surface vessel V.

The described system 100 is suitable for laying the cable 12 in patterns which may include 90 degree turns as shown in FIG. 3. A turn can be achieved by reducing the speed of the surface vessel V as it approaches the turn, so that the submersible cable deployment system 20, 20' can assume a near steady state position below the vessel V. Thrust is then used to guide the submersible cable deployment system 20, 20' around the turn as the vessel V turns. The minimum turning radius is limited only by the need to maintain adequate tension in the deployed cable 12 without dragging previously laid cable 12 out of the desired position.

When the length of the cable 12 has been deployed, the riser cable section 14 is lowered to land the submersible cable deployment system 20, 20' on the sea floor F. The thruster and instrumentation package, if used, is recovered from the deployment system 20, 20'. The drum 16, 16' can then be anchored to the sea floor F to isolate the deployed cable 12 from tension loads in the riser segment 14.

More of the riser segment 14 is then spooled off the winch drum 22 on the surface vessel V and laid on the sea floor F to the point from which the riser 14 is to be installed from the sea floor F to the surface W. The upper end of the riser 14 is then handed off to a permanent surface facility (not shown) or buoyed for later recovery and attachment.

The foregoing disclosure and description of the invention are illustrative and explanatory thereof, and various changes in the details of the illustrated apparatus and construction and method of operation may be made without departing from the spirit of the invention.

We claim:

1. A cable deployment system for laying a cable on the sea floor from a surface vessel, the deployment system comprising:
    a cable having a first cable section and a riser cable section; and
    a drum capable of containing a predetermined length of said first cable section, said riser cable section connected to said drum and adapted for lowering said drum containing said first cable section to the sea floor from the surface vessel.

2. The deployment system of claim 1, wherein said cable includes electrical conductors within a protective jacket.

3. The deployment system of claim 2, wherein said cable includes fiber optic conductors.

4. The deployment system of claim 2, wherein said riser cable section includes an external armor surrounding said protective jacket to provide a structural load path as said drum is lowered.

5. The deployment system of claim 1, further comprising an anchor for securing an end of said first cable section to the sea floor.

6. The deployment system of claim 1, further comprising a stinger attached to said drum and shaped to allow said first cable section to exit said drum.

7. The deployment system of claim 1, further comprising a tensioning device attached to said drum, said tensioning device capable of maintaining a tension in a deployed portion of said first cable section during deployment of said first cable section from said drum.

8. A method of deploying a cable in deep water from a surface vessel, the cable having a first cable section and a riser cable section, the method comprising the steps of:
    containing the first cable section within a drum;
    lowering the drum containing the first cable section from the surface vessel to a position near the sea floor, the drum being lowered by the riser cable section;
    securing an end of the first cable section to the sea floor; and
    deploying the first cable section from the drum onto the sea floor.

9. The method of claim 8, wherein said step of lowering the drum is achieved by unspooling the riser cable section from a winch.

10. The method of claim 9, wherein said riser cable section is spooled on a winch of the surface vessel.

11. The method of claim 8, wherein said step of securing the end of the first cable section to the sea floor is accomplished by attaching the end of the first cable section to an anchor.

12. The method of claim 11, wherein said step of securing is accomplished with a remotely operated submersible vehicle.

13. The method of claim 8, wherein said step of deploying the first cable section from the drum onto the sea floor comprises motoring the surface vessel along the desired route of the first cable section.

14. The method of claim 13, further comprising the step of securing the drum to the sea floor.

15. The method of claim 8, further comprising the step of maintaining tension in the deployed portion of the first cable section as the first cable section is deployed from the drum.

16. The method of claim 8, further comprising the step of securing the drum to the sea floor.

17. A cable deployment system for laying a cable on the sea floor, the deployment system comprising:

a seismic cable having a first cable section and a second riser cable section, said second riser cable section including armor; and a drum capable of containing a predetermined length of said first cable section, said armor of said second riser cable section connected to said drum.

18. The deployment system of claim 17, wherein said drum has an opening and said first cable section is capable of being contained within said drum and deployed through said opening.

19. The deployment system of claim 17, wherein said cable includes continuous wires extending the length of said cable.

20. The deployment system of claim 17, further comprising a tensioning device attached to said drum, said tensioning device maintaining tension in the deployed portion of said first cable section during deployment from said drum.

21. The deployment system of claim 17, further comprising a stinger attached to said drum, said stinger conducting said first cable section out of said drum and onto the sea floor.

22. A method of deploying a cable in deep water from a surface vessel, the cable having a first cable section and a riser cable section, the cable having electrical conductors extending the length of the cable, the method comprising the steps of:

attaching the riser cable section to a drum;

coiling the first cable section within the drum;

lowering the drum from the surface vessel via the riser cable section;

securing an end of the first cable section to the sea floor; and deploying the first cable section from the drum onto the sea floor.

23. The method of deploying of claim 22, further comprising the step of spooling the riser cable section onto a winch on the surface vessel, wherein the step of lowering the drum is achieved by paying out the riser cable section on the winch.

24. The method of deploying of claim 22, wherein the riser cable section includes armor and the step of attaching the riser cable section to the drum includes securing the armor to the drum.

25. The method of deploying of claim 22, wherein the step of deploying the first cable section comprises motoring the surface vessel along the desired route of the first cable section.

26. The method of deploying of claim 22, further comprising the step of maintaining tension in the deployed portion of the first cable section during deployment.

27. The method of deploying of claim 22, further comprising the step of securing the drum to the sea floor.

* * * * *